United States Patent [19]

Moteki et al.

[11] Patent Number: 5,756,171
[45] Date of Patent: May 26, 1998

[54] LAMINATE FILM AND METHOD OF PRODUCING THE SAME

[75] Inventors: Yoshiji Moteki, Kitaadachi-gun; Takayuki Kotani, Fujimi, both of Japan

[73] Assignee: Kabushiki Kaisha Hosokawa Yoko, Japan

[21] Appl. No.: 170,737

[22] Filed: Dec. 21, 1993

[30] Foreign Application Priority Data

| Dec. 22, 1992 | [JP] | Japan | 4-087912 U |
| Apr. 8, 1993 | [JP] | Japan | 5-082131 |
| Apr. 28, 1993 | [JP] | Japan | 5-102933 |
| Sep. 27, 1993 | [JP] | Japan | 5-239588 |

[51] Int. Cl.[6] ........................ B27N 5/02
[52] U.S. Cl. .............. 428/36.6; 428/35.8; 428/35.9; 428/458; 428/461; 428/480; 428/483; 428/500; 156/244.1
[58] Field of Search ................ 428/480, 483, 428/500, 461, 35.8, 35.9, 36.6, 458; 156/244.1

[56] References Cited

U.S. PATENT DOCUMENTS

| 3,442,686 | 5/1969 | Jones | 117/70 |
| 4,528,234 | 7/1985 | Kaiho et al. | 428/216 |
| 5,019,442 | 5/1991 | Ogawa et al. | 428/215 |
| 5,084,356 | 1/1992 | Deak et al. | 428/458 |
| 5,314,561 | 5/1994 | Komiya | 156/244.11 |
| 5,387,449 | 2/1995 | Kunz et al. | 428/35.4 |

FOREIGN PATENT DOCUMENTS

| 0203612 | 12/1986 | European Pat. Off. . |
| 0 312 308 | 4/1989 | European Pat. Off. . |
| 1 426 124 | 2/1976 | United Kingdom . |
| 2 026 942 | 2/1980 | United Kingdom . |
| 2027391 | 2/1980 | United Kingdom . |

*Primary Examiner*—E. Rollins Buffalow
*Attorney, Agent, or Firm*—Parkhurst & Wendel, L.L.P.

[57] ABSTRACT

A laminate film having two olefin type films, a heat resistant film with a vapor deposition coat of aluminum oxide on each surface thereof and a heat adhesion resin layer for joining the olefin type films to the heat resistant film. Instead of the heat resistant film and the heat adhesion resin layer, an oriented film of ethylene-vinyl alcohol copolymer resin layer and a co-extrusion resin layer including a heat adhesion resin layer and an olefin type resin layer may be used. The heat adhesion resin layer is maintained in a heating state for a predetermined time when the laminate film is manufactured.

21 Claims, 5 Drawing Sheets

LAMINATE FILM AND METHOD OF PRODUCING THE SAME

BACKGROUND OF THE INVENTION

The present invention relates to a laminate film to be used for an infusion solution package or a container for retort pouch food, etc., and a method of producing the laminate film.

Hitherto, there has been known a container for retort pouch food as a container with a high barrier property, a heat resistance and a low permeability to oxygen and water vapor. Such a conventional container for retort food generally has been formed of a laminate film including metal foil such as aluminum foil because the container requires both an airtight property and a light shielding property. In a special case, a container for retort pouch food has been formed of a laminate film comprising a vacuum deposition (metallizing) film on which aluminum or silicon oxide is deposited. In these conventional containers for retort pouch food. An urethane type adhesive has been used as an adhesive for lamination.

On the other hand, there has been known a heat resistant container such as an infusion solution bag which contains therein an infusion solution designated by Japan pharmaceutical codex or a nutritious food (liquid) for supplying nutrition to a patient. In such a heat resistant container, it is necessary to make it possible to easily confirm foreign matter mixed in the content to be contained in the heat resistant container by using transparent material as the packaging material. In addition, such a heat resistant container requires a high barrier property. The heat resistant container for nutritious food is heated by heating means such as an electronic oven in order to heat the nutritious food without opening the container.

However, in a case where the heat resistant container for the nutritious food is formed of the laminate film having metal foil such as aluminum foil it is impossible to heat the nutritious food packaged in the container using an electronic oven, since a microwave generated from an oscillator (generator) of the electronic oven is reflected by the metal foil.

Further, in the field of the heat resistant container for the infusion solution designated by Japan pharmaceutical codex, the use of an adhesive has generally been prohibited. Therefore, in a case where the heat resistant container is formed of a laminate film using the urethane type adhesive, such a container does not conform to the standard of an extraction test designated by Japan pharmaceutical codex for obtaining ultraviolet absorption spectrum with respect to a plastic container for infusion solution.

For the purpose of solving such problems, there has been proposed a heat resistant container formed of a vacuum deposition laminate film comprising a polyester film having a thin vacuum deposition coat of aluminum oxide on one surface thereof, a polyester film having a thin vacuum deposition coat of aluminum oxide on both surfaces thereof and a cast polypropylene film to be located at the inner surface of the container in that order. These films are bonded to each other by modified polypropylene layers.

Such a laminate film is transparent so that foreign matters mixed in the content to be contained in the heat resistant container can be easily confirmed. In addition, such a laminate film is formed without the urethane type adhesive, so that a problem with respect to adhesive does not exist.

However, since the polyester film located on the outside of the container has a hydrolysis property, the polyester film is hydrolyzed when the container is dipped into heated water. Therefore, there is a case that such a container does not conform to the standard of an extraction test for obtaining ultraviolet absorption spectrum with respect to a plastic container for infusion solution, designated by Japan pharmaceutical codex.

Further, a polyester film has an excellent heat resistant property, but does not have a sufficient oxygen barrier property. The cast polypropylene is relatively rigid to increase the rigidity of such a container. As a result, in a case where the container is used as a container for instillation, such a container is not deformed according to a reduction of content so that it is difficult to maintain a constant dropping velocity of the instillation.

In addition, choice heat adhesive resin such as modified polypropylene is generally liable to dissolve in heated water, it is necessary to decrease a thickness of the heat adhesive resin film in order to decrease an extracted amount of the adhesive resin in heated water.

When a packaging bag is formed of a laminate film by bonding a plurality of films with an adhesive, there has been problems such that a solvent and a smell generated from the adhesive attach to the content contained in the packaging bag, and then a taste and an aroma of the content are changed.

For the purpose of solving such a problem, there has been proposed a method for producing a laminate film without adhesives. In such a method, the laminate film is produced in the following steps. First, a fused resin film supplied from a T-die is joined to a base film to form an integral laminate film, and then, such an integral laminate film is chilled and solidified by means of a chilled roll so as to form a temporarily bonded film which is thereafter heated and chilled in a separate step.

However, the method needs a temporary adhesion step, a heating step and a chilling step to make the method complicated. The temporarily bonded film made in the temporary adhesion step must be rolled up on a roll and taken out from the roll. At this time, one film is deviated from other films to generate wrinkles and to decrease a barrier property. Further, when the laminate film is formed of a polypropylene film, control of quality with passage of time from the cooling step to the heating step is difficult.

SUMMARY OF THE INVENTION

It is an object of the present invention to provide a laminate film which has a flexibility so as to deform in accordance with the decrease of content in a container made of the laminate film thereby to maintain a constant dropping velocity of the content and which conforms to the standard of an extraction test for obtaining ultraviolet absorption spectrum for an infusion solution container, designated by Japan pharmaceutical codex.

It is another object of the present invention to provide a method of providing a laminate film in which each layer forming the laminate film is not deviated from each other during a laminating step to prevent generation of wrinkles on the laminate film by eliminating defects in workability of a heat adhesive resin layer.

According to a first aspect of this invention, there is provided a laminate film comprising a plurality of olefine type films not having a hydrolysis property, but a heat resistant property, and at least one heat resistant film, both surfaces of which have vapor deposition coats of aluminum oxide and which is disposed between the olefine type films so as to be joined therewith via heat adhesive layers.

According to a second aspect of this invention, there is provided a laminate film comprising a plurality of olefine type films not having a hydrolysis property, but a heat resistant property, and at least one heat resistant film, both surfaces of which have vapor deposition coats of aluminum oxide and which is disposed between the olefine type films so as to be joined thereto via co-extruded resin layers each comprising a heat adhesion resin layer and an olefine type resin layer.

In these laminate films according to the first and second aspects of this invention, the heat resistant film disposed intermediately between the olefine type films does not hydrolyze when it is dipped into hot water because an olefine type film with a heat resistant property and without a hydrolysis property is disposed on the outer surface side of a container and a vapor deposition coat of aluminum oxide is provided on each surface of the heat resistant film. Therefore, the laminate film conforms to the standard designated by Japan pharmaceutical codex in an extraction test for obtaining ultraviolet absorption spectrum with respect to a plastic container for infusion solution. Further, since the co-extruded resin layer of the heat adhesive resin layer and the olefine resin layer is disposed between the heat resistant film with a vapor deposition coat of aluminum oxide and the olefine type film, the laminate film is transparent and has a good gas barrier property, and a container made of the laminate film has a flexibility thereby to maintain constant dropping velocity of the content in the container.

According to a third aspect of this invention, there is provided a laminate film comprising a plurality of olefin type films not having a hydrolysis property but a heat resistant property between which an oriented film made of ethylene-vinyl alcohol copolymer resin with a vapor deposition coat on each surface thereof is disposed so as to be joined to the olefin type films via co-extruded resin layers each comprising a heat adhesive resin layer and an olefin type resin layer.

In such a laminate film, the olefin type film not having a hydrolysis property but a heat resistant property and located on the outerside of a container and a deposition coat of aluminum oxide provided on each surface of the oriented film made of ethylene-vinyl alcohol copolymer resin and disposed between the olefin type films can effectively prevent the oriented film from hydrolyzing when the container is dipped into hot water. Further, the deposition coat of aluminum oxide can prevent the laminate film from degrading in transparency caused by whitening of the ethylene-vinyl alcohol copolymer resin at the time of moisture absorption. Therefore, the laminate film does not absorb much moisture to maintain an oxygen barrier property and to prevent the formation of bubbles in the container.

According to a fourth aspect of this invention, there is provided a laminate film which comprises a thin olefin type film having a heat resistant property and not having a hydrolysis property, an aluminum foil, a heat adhesion resin layer disposed between the olefin type film and the aluminum foil, thick olefin type film, and a co-extrusion resin layer including a heat adhesion layer and an olefin type resin layer for joining the aluminum foil to the thick olefin type film.

According to a fifth aspect of this invention, there is provided a method of manufacturing a laminate film which comprises the steps of preparing olefin type films having a heat resistant property and not having a hydrolysis property and at least one heat resistant film with a vapor deposition coat on each surface thereof, melt-extruding a heat adhesion resin layer between the olefin type films and the heat resistant film, maintaining the heat adhesion resin layer in a heating state for a predetermined period of time, cooling and solidifying the heat adhesion resin layer to join the heat resistant film to the olefin type films.

According to a sixth aspect of this invention, there is provided a method of manufacturing a laminate film which comprises the steps of preparing olefin type films having a heat resistant property and not having a hydrolysis property and at least one heat resistant film with a vapor deposition coat on each surface thereof, melt-extruding a co-extrusion resin layer including a heat adhesion resin layer and an olefin type resin layer between the olefin type films and the heat resistant film in a state wherein the heat adhesion resin layer is opposed to the heat resistant film while the olefin type resin layer is opposed to the olefin type film, maintaining the co-extrusion resin layer in a heating state for a predetermined period of time and cooling and solidifying the co-extrusion resin layer to join the heat resistant film to the olefin type films.

In such a method, when the co-extrusion resin layer is joined to the olefin type films, since it is maintained in a heating state for a predetermined time after a heat-extrusion and then cooled, each layer is not deviated from each other to prevent generation of wrinkles and productivity is increased because of decrease of steps for manufacturing the laminate film.

According to a seventh aspect of this invention, there is provided a method of manufacturing a laminate film which comprises the steps of preparing olefin type films having a heat resistant property and not having a hydrolysis property and at least one oriented film of ethylene-vinyl alcohol copolymer resin with a vapor deposition coat on each surface thereof, melt-extruding a co-extrusion resin layer including a heat adhesion resin layer and an olefin type resin layer between the olefin type films and the oriented film in a state wherein the heat adhesion resin layer is opposed to the oriented film while the olefin type resin layer is opposed to the olefin type film, maintaining the co-extrusion resin layer in a heating state for a predetermined period of time and cooling and solidifying the co-extrusion resin layer to join the heat resistant film to the olefin type films.

According to an eighth aspect of this invention, there is provided a method of manufacturing a laminate film in which a partial laminate film comprising a heat resistant film and an aluminum foil joined to the heat resistant film via a resin layer and an olefin type film are prepared to be heat-coextruded in a manner that a heating state is maintained for a predetermined period of time thereby to enable the laminating step to be performed continuously and shortened. Therefore, productivity is increased. In addition, the films to be joined are not deviated from each other to prevent generation of wrinkles.

Further objects, features and other aspects of this invention will be understood from the following detailed description of the preferred embodiments of this invention with reference to the drawings.

PREFERRED EMBODIMENTS OF THIS INVENTION

Figure 1:
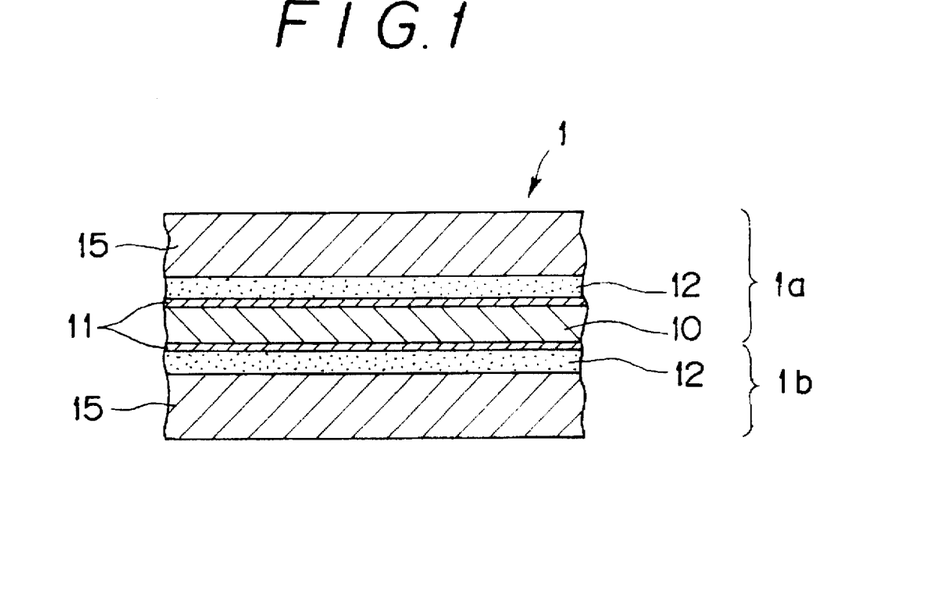
FIG. 1 is a schematic sectional view of a laminate film showing a first embodiment thereof according to this invention.

In FIG. 1, a laminate film 1 of this invention comprises two olefin type films 15, 15 each of which has a heat resistant property and does not have a hydrolysis property, a heat resistant film 10, e.g., a polyester film having two vapor deposition coats 11, 11 of aluminum oxide on both surfaces thereof, respectively, and two modified polypropylene layers 12, 12, as an adhesive(heat adhesive layer), disposed on both surfaces of the heat resistant film 10 and between the two olefin type films 15, 15 and the heat resistant film 10. The olefin type film 15 comprises, e.g., a composition in which rubber type elastomer obtained by emulsion polymerization is mixed into copolymer of polypropylene and ethylene. The amount of the rubber type elastomer is determined so as to have a Young's modulus of less than 30 kg/mm² and a tensile strength of more than 100 kg/cm². The polyester film 10 has, e.g., a thickness of 12 μm, and each of the vapor deposition coats 11, 11 disposed on both surfaces of the polyester film 10 comprises amorphous aluminum oxide having a thickness of 200 Å formed on the surface of the polyester film 10 through a normal vapor deposition process. In general, normal crystalline aluminum oxide has a good transparency and a gas barrier property, but it cannot maintain the gas barrier property in a container because of a little adhesive property to a base film and a little flexibility. Therefore, the amorphous aluminum oxide is preferable. The aluminum oxide coat 11 may include amorphous aluminum oxide of more than 98 weight percentage in which a component, of approximately less than 10 weight percentage, comprising metal such as aluminum, copper, iron, zinc, molybdenum, chromium and tungsten, nitride such as boron nitride and oxide such as silicon oxide and zinc oxide may be included. Further, the modified polypropylene layer 12 is modified resin by maleic anhydride and has a thickness of 5 μm. The thickness of the olefin type film 15 is changed in case of necessity. In case of an infusion solution bag using the laminate film 1, the thickness of the olefin type film 15 is preferably 70 μm.

The laminate film 1 is manufactured in the following the method of the present invention.

Figure 2:
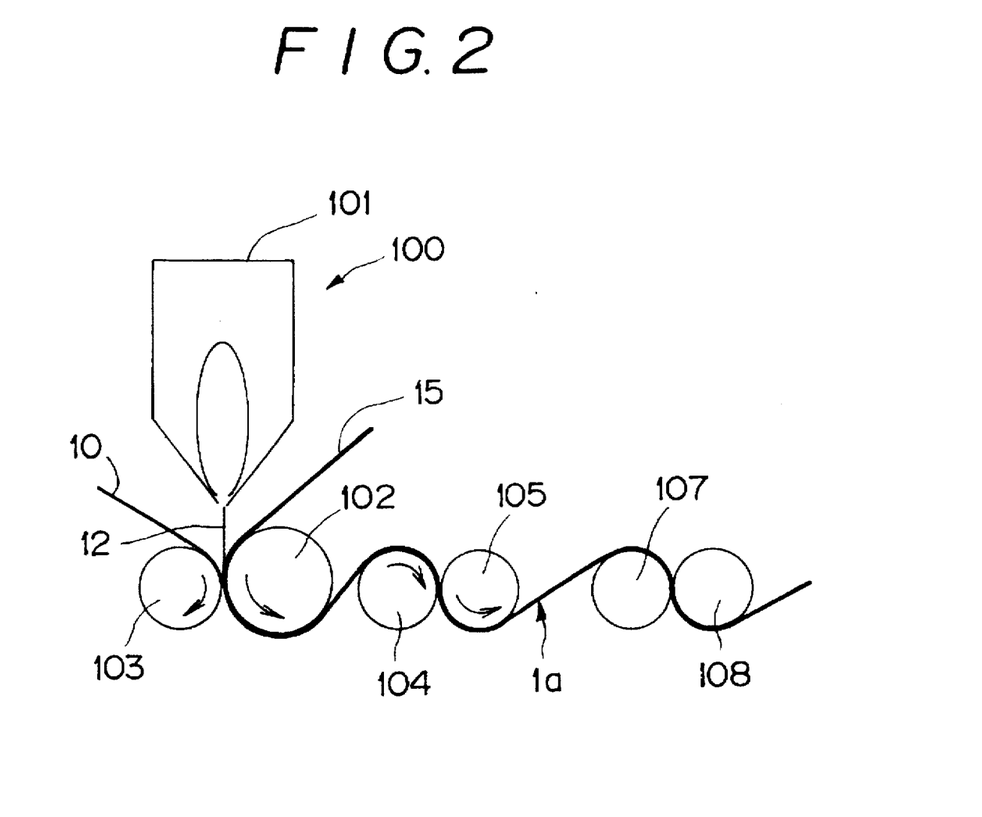
FIG. 2 is a schematic explanatory view showing a first embodiment of a method of manufacturing the laminate film.

In FIG. 2, first, a device 100 for manufacturing the laminate film 1 has a T-die 101 for extrusion of the modified polypropylene 12, a chilled or cooling roll 102 cooperating with a rubber roller 103, a heating roll 104, a guide roll 105 cooperating with the heating roll 104, a cooling roll 107 and a guide roll 108 cooperating with the cooling roll 107. One olefine type film 15 and the polyester film 10 with the vapor deposition coat 11 of aluminum oxide on each surface thereof are prepared beforehand. The modified polypropylene layer film 12 is supplied from the T-die 101 to be disposed between the polyester films 10 and the olefine type film 15, and those three film 10, 12, 15 are laminated by the rubber roll 103 and the chilled roll 102 to provide a partial laminate film 1a (FIG. 1) including one olefin type film 15, the modified polypropylene layer 12 and the polyester film 10. Then, the partial laminate film 1a is heated between the heating roll 104 and the guide roll 105 at a temperature of 200° C. and at a feeding velocity of 40 m/minute in order to prevent the degradation of a gas barrier property and thereafter the partial laminate film 1a is cooled by the cooling roll 107. After this, the partial laminate film 1a and the remaining partial laminate film 1b including the other olefin type film 15 and the modified polypropylene layer 12 are laminated in the above manner. Instead of the polyester film 10 in FIG. 2, the partial laminate film 1a is fed so that the polyester film 10 of the film 1a is opposed to the modified polypropylene film 12.

The modified polypropylene film 12 is fed at a temperature of approximately 300° C. from the T-die 101. The melting point of the olefin type film 15 is approximately 100°–150° C., but the melting point of the polyester film 10 is much higher than that of the polyester film 10. The chilled or cooling roll 102 cools the partial laminate film 1a to a temperature under the melting point of the olefin type film 15. The heating roll 104 heats the film 1a to a temperature 200° C. to bond reliably the olefin type film 15 to the polyester film 10 via the modified polypropylene layer 12. Thereafter, the partial laminate film 1a is cooled to room temperature by the cooling roll 107. Each roll 102, 104, 107 functions in the same manner also when the two partial laminate films 1a, 1b are bonded to each other.

Figure 3:
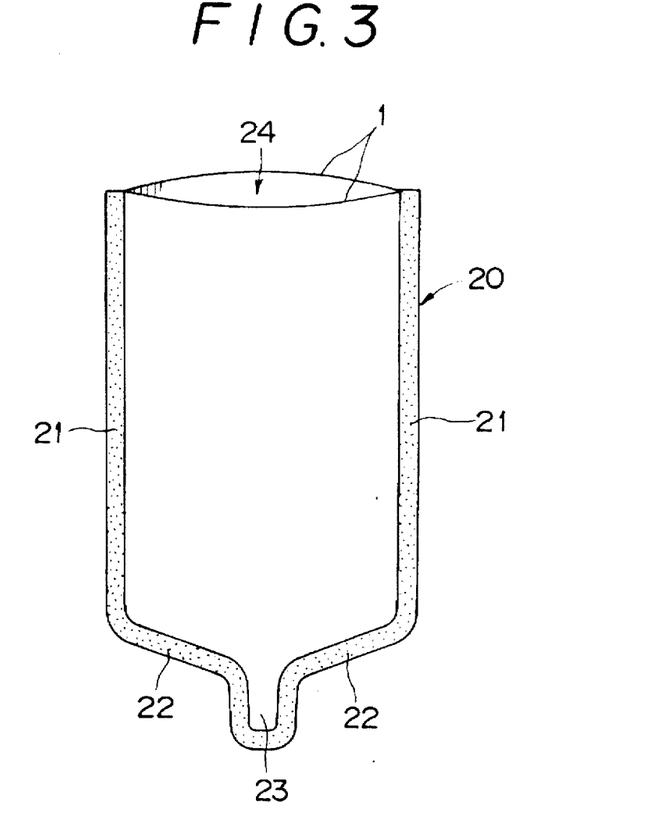
FIG. 3 is a perspective view of an infusion solution bag using the laminate film according to this invention.

Two plastic laminate films 1,1 manufactured in this manner are heat-sealed at their peripheries to form an infusion solution bag 20 which is transparent and heat-resistant. For example, FIG. 3 shows a perspective view of an infusion solution bag 20 to which the laminate film 1 of this invention is adapted, the infusion solution bag 20 is formed so that two laminate films 1,1 are joined together and the opposite edges 21,21 and the lower edge 22 are heat-sealed by a normal heat seal means. At the lower ends of the bag 20 is formed a take out opening 23 for taking content therein out of the bag 20. An upper opening 24 of the bag 20 is heat-sealed after content such as nutrious liquid is put into the bag 20.

The olefin type films 15 located on the outerside of the bag 20 prevent modification of the polyester film 10 due to hydrolysis. Therefore, even if the bag 20 is dipped into hot water, the bag 20 conforms to the standard of an extraction test for obtaining ultraviolet heat absorption spectrum. Further, the combination of flexibility of the olefin type film 15 located on the outerside of the bag 20 and a rigidity of the polyester film 10 maintains a suitable stiffness of the bag 20 as a whole and a suitable flexibility. Therefore, in the case of the infusion solution bag 20, the outer shape can be changed in accordance with the amount of dropping of content therein thereby to maintain a constant dropping velocity.

The heat resistant bag was not broken during a retort pasteurization treatment at a temperature of 130° C. and for 30 minutes. A good property for strength against dropping of the bag including content therein was confirmed.

In the above embodiment, only one polyester film 10 with the vapor deposition coats 11, 11 on its both surfaces is used, and, however, more than one polyester film 10 may be used. In this case, those polyester films 10 are joined to each other by modified polypropylene. If the content in the bag has a high acidity, it is preferable that silica is vapor-deposited on the polyester film 10 and a vapor deposition coat of aluminum oxide is then formed thereon.

The laminate film 1 can be used as a bag in bottle-like shape or other shapes.

Instead of the vapor deposition coat of aluminum oxide, a vapor deposition coat of silicon oxide may be formed.

Figure 4:
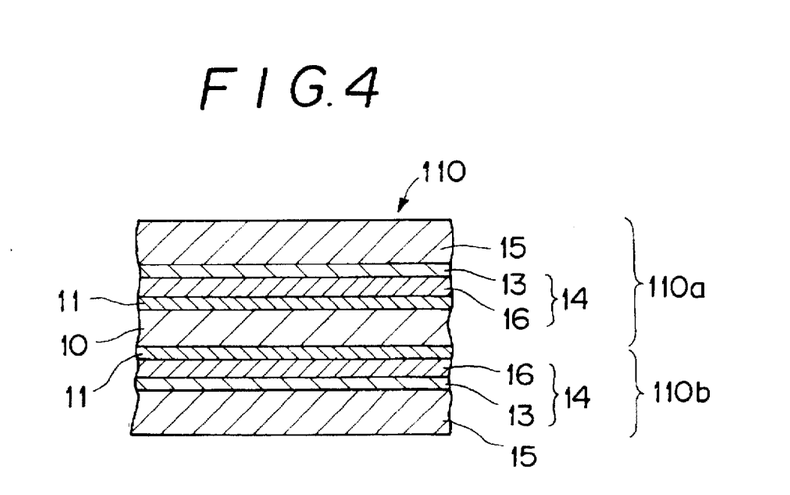
FIG. 4 is a schematic sectional view of a laminate film showing a second embodiment thereof according to this invention.

FIG. 4 shows a second embodiment of a laminate film according to this invention. A laminate film 110 comprises two olefin type films 15, 15 each having a heat resistant property and not having a hydrolysis property, a heat resistant film, e.g., a polyester film 10 with a vapor deposition coat 11 of aluminum oxide on each surface thereof, disposed between the two olefin type films 15, 15, and two co-extrusion resin layers 14, 14 disposed on both sides of the polyester film 10 and between the polyester film 10 and the two olefin type films 15, 15, respectively.

The olefin type film 15 comprises, e.g., a composition in which rubber type elastomer obtained by emulsion polymerization is mixed into copolymer of polypropylene and ethylene. The amount of the rubber type elastomer is determined so as to have a Young's modulus of less than 30 kg/mm$^2$ and a tensile strength of more than 100 kg/cm$^2$. The polyester film 10 has, e.g., a thickness of 12 μm, and each of the vapor deposition coats 11, 11 disposed on both surfaces of the polyester film 10 comprises amorphous aluminum oxide having a thickness of 200 Å formed on the surface of the polyester film 10 through a normal vapor deposition process. In general, normal crystalline aluminum oxide has a good transparency and gas barrier property, but it cannot maintain the gas barrier property in a container because of a little adhesive property to a base film and a little flexibility. Therefore, the amorphous aluminum oxide is preferable. The aluminum oxide coat 11 may include amorphous aluminum oxide of more than 98 weight percentage in which a component, of approximately less than 10 weight percentage, comprising metals such as aluminum, copper, iron, zinc, molybdenum, chromium and tungsten, nitride such as boron nitride and oxide such as silicon oxide and zinc oxide may be included.

The co-extrusion resin layer 14 comprises a heat adhesive resin layer 16 and an olefin type resin layer 13 (e.g., polypropylene, high-density polyethylene(HDPE), high-density polyethylene/linear low-density polyethylene (HDPE/LLDPE)). The heat adhesive resin layer 16 comprises e.g., a modified polypropylene resin layer and has a thickness of approximately 5 μm. The thickness of the olefin type film 15 is changed if necessary. The laminate film 110 can be adapted to the infusion solution bag 20 shown in FIG. 3.

Figure 5:
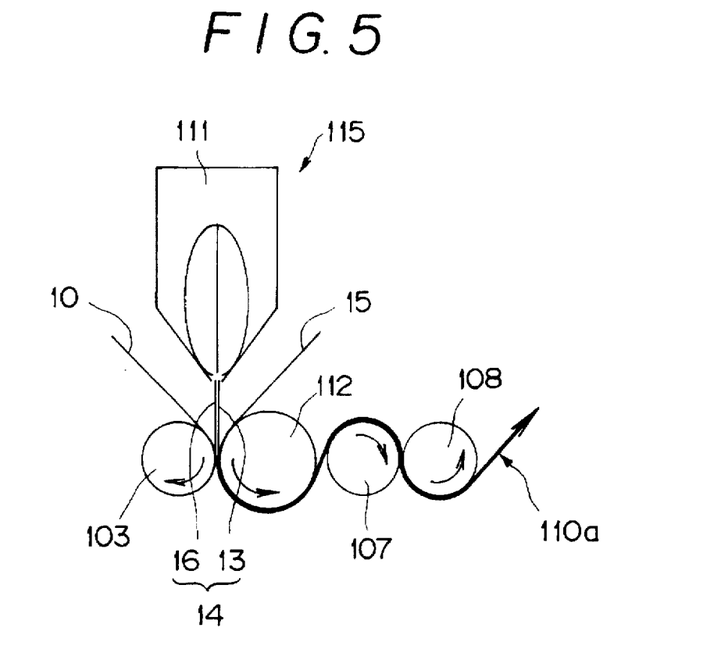
FIG. 5 is a schematic explanatory view showing second and third embodiments of a method of manufacturing a laminate film according to this invention.

A device 115 for manufacturing the laminate film 110 comprises a T-die 111 for co-extrusion of the heat adhesive resin layer 16 and the olefin type resin layer 13, a heating roll 112 for heating each layer at an intermediate temperature, a rubber roll 103 cooperating with the heating roll 112, a cooling roll 107 and a guide roll 108. The heating roll 112 corresponds to the cooling roll 102 and the heating roll 104 in FIG. 2. That is, the heating roll 112 has two functions of heating each film at an intermediate temperature of 160°–200° C. and cooling the co-extrusion resin layer 14 fed at a temperature of approximately 190°–300° C. from the T-die 111 to the intermediate temperature at which the olefin type film 15 in not melted. The cooling roll 107 cools each film to a room temperature.

Next, a second embodiment of a method of manufacturing the laminate film 110 will now be explained.

First, the polyester film 10 with the vapor deposition coat 11 of aluminum oxide on each surface thereof and two olefin type films 15, 15 are prepared. The polyester film 10 and the olefin type film 15 are fed by feeding means (not shown) to a space between the rubber roll 103 and the heating roll 112 so that the olefin film 15 is opposed to the surface of the heating roll 112 while the polyester film 10 is opposed to the rubber roll 103. At the same time, the co-extrusion resin layer 14 (at a temperature of 190°–300° C.) is co-extruded so that the olefin type resin layer 13 is opposed to the olefin type film 15 while the heat adhesive layer 16 is opposed to the polyester film 10 to form a partial laminate film 110a as shown in FIG. 5. Thereby, the polyester film 10 and the olefin type film 15 are bonded to each other by the co-extrusion resin layer 14. The heating roll 112 maintains a heating state at a temperature of 160° C.–200° C. for a predetermined period of time. That is, the heating roll keeps a temperature under the melting point of the olefin type film 15 and above the softening point of the co-extrusion resin layer. The maintaining time in the heating state is, e.g., 0.5–1.5 seconds. The cooling roll 107 located on the downstream side of the heating roll 112 cools (10° C.–40° C.) and solidifies the joined polyester film 10 and the olefin type film 15 to form the partial laminate film 110a.

Figure 6:
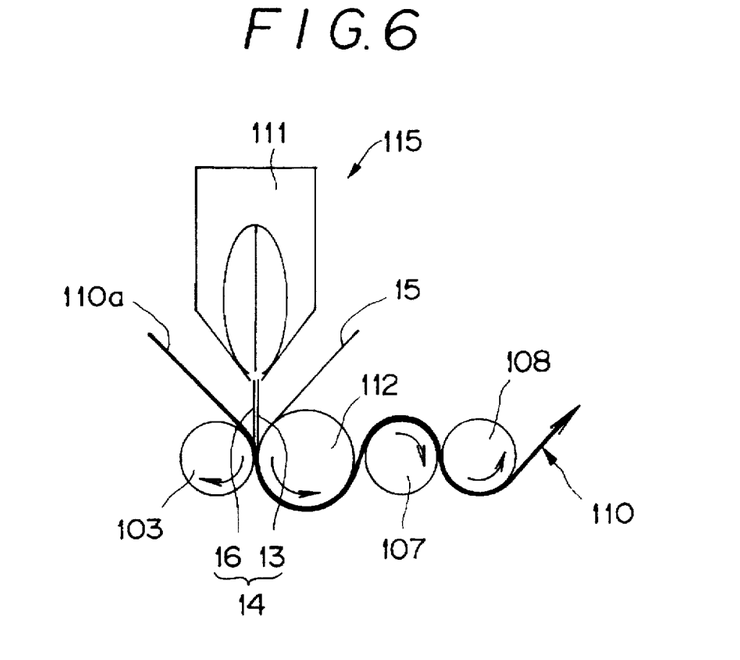
FIG. 6 is a schematic explanatory view showing second and third embodiments of a method of manufacturing a laminate film according to this invention.

Next, the partial laminate film 110a is bonded to the olefin type film 15 via the co-extrusion film 14 including the heat adhesive resin layer 16 and the olefin type resin layer 13 by means of the same device 115 as shown in FIGS. 5 and 6. That is, the partial laminate film 110a and the olefin type film 15 are fed into a space between the two rolls 102, 103 by means of feeding means (not shown) in a state wherein the partial laminate film 110a is opposed to the rubber roll 102 while the olefin type film 15 is opposed to the heating roll 112. At the same time, the co-extrusion film 14 is fed between the partial laminate film 110a and the olefin type film 15 to form the laminate film 110 in a state wherein the olefin type resin layer 13 is opposed to the olefin type film 15 while the heat adhesion resin layer 16 is opposed to the partial laminate film 110a. At this time, the laminate film 110 is maintained at a temperature of 160° C.–200° C. for 0.5–1.5 seconds. The bonded laminate film 110 is then cooled by the cooling roll 104 to a temperature of 10° C.–40° C.

The disposition of rolls 103, 112, 107, 108 in FIGS. 5 and 6 can be replaced with the disposition of rolls 103, 102, 104, 105, 107, 108 in FIG. 2 under the same condition.

The laminate film 110 manufactured in this manner is adapted to the infusion solution bag 20 in FIG. 3.

In this case, the olefin type films 15 located on the outerside of the bag 20 prevents modification of the polyester film 10 due to hydrolysis. Therefore, even if the bag 20 is dipped into hot water, the bag 20 conforms to the standard of an extraction test for obtaining ultraviolet heat absorption spectrum. Further, the combination of flexibility of the olefin type film 15 located on the outerside of the bag 20 and rigidity of the polyester film 10 maintain a suitable stiffness of the bag 20 as a whole and a suitable flexibility. Therefore, in the case of the infusion solution bag 20, the outer shape can be changed in accordance with the amount of dropping of content therein thereby to maintain a constant dropping velocity.

The heat resistant bag was not broken during a retort pasteurization treatment at a temperature of 130° C. and for 30 minutes. A good property for strength against dropping of the bag including content therein was confirmed.

In the above embodiment, only one polyester film 10 with the vapor deposition coats 11, 11 on its both surfaces is used, and, however, more than one polyester film 10 may be used. In this case, those polyester film 10 are joined to each other by modified polypropylene. If the content in the bag has a high acidity, it is preferable that silica is vapor-deposited on the polyester film 10 and a vapor deposition coat of aluminum oxide is then formed thereon.

Instead of the vapor deposition coat of aluminum oxide, a vapor deposition coat of silicon oxide may be formed.

Figure 7:
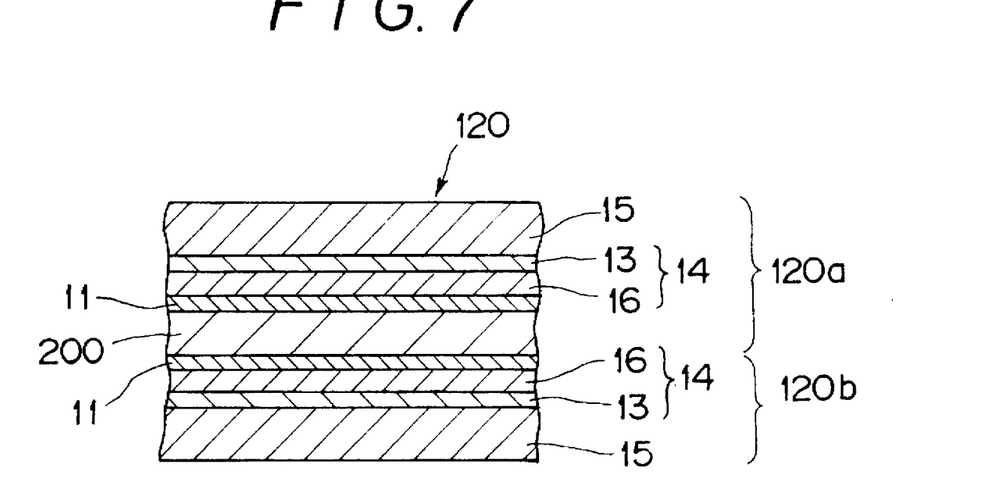
FIG. 7 is a schematic sectional view of a laminate film showing a third embodiment thereof according to this invention.

FIG. 7 is a schematic sectional view showing a third embodiment of a laminate film of this invention. A laminate film 120 comprises two olefin type films 15 having a heat resistance and not having a hydrolysis property, an oriented film 200 of ethylene-vinyl alcohol copolymer resin layer with vapor deposition coats of aluminum oxide on both surfaces thereof, and two co-extrusion resin layers 14 including a heat adhesion resin layer 16 and an olefin type resin layer 13, and disposed between the two olefin type films 15 and the oriented film 200, respectively.

The olefin type film 15 comprises, e.g., a composition in which rubber type elastomer obtained by emulsion polymerization is mixed into copolymer of polypropylene and ethylene. The amount of the rubber type elastomer is determined so as to have a Young's modulus of less than 30 kg/mm² and a tensile strength of more than 100 kg/cm². The oriented film 20 of ethylene-vinyl alcohol copolymer resin has, e.g., a thickness of 12 μm, and each of the vapor deposition coats 11, 11 disposed on both surfaces of the oriented film 200 comprises amorphous, aluminum oxide having a thickness of 200 Å formed on the surface of the oriented film 200 through a normal vapor deposition process. In general, normal crystalline aluminum oxide has a good transparency and a gas barrier property, but it cannot maintain the gas barrier property in a container because of a little adhesive property to a base film and a little flexibility. Therefore, the amorphous aluminum oxide is preferable. The aluminum oxide coat 11 may include amorphous aluminum oxide of more than 98 weight percentage in which a component, of approximately less than 10 weight percentage, comprising metals such as aluminum, copper, iron, zinc, molybdenum, chromium and tungsten, nitride such as boron nitride and oxide such as silicon oxide and zinc oxide may be included.

The heat adhesive resin layer 16 comprises e.g., a modified polypropylene resin layer and has a thickness of approximately 5 μm. The thickness of the olefin type film 15 is changed if necessary. The laminate film 120 can be adapted to the infusion solution bag 20 shown in FIG. 3.

Next, a third embodiment of the present method for manufacturing laminated film 120 by device 115 will be explained with reference to FIGS. 5 and 6.

First, the oriented film 200 with the vapor deposition coat 11 of aluminum oxide on each surface thereof and two olefin type film 15, 15 are prepared. The oriented film 200 and the olefin type film 15 are fed by feeding means (not shown) to a space between the rubber roll 103 and the heating roll 112 so that the olefin type film 15 is opposed to the surface of the heating roll 112 while the oriented film 200 is opposed to the rubber roll 103. At the same time, the coextrusion resin layer 14 (at a temperature of 190°–300° C.) is co-extruded so that the olefin type resin layer 13 is opposed to the olefin type resin film 15 while the heat adhesive layer 16 is opposed to the oriented film 200 to form a partial laminate film 120a as shown in FIG. 7. Thereby, the oriented film 200 and the olefin type film 15 are bonded to each other by the co-extrusion layer 14. The heating roll 112 maintains a heating state at a temperature of 160° C.–200° C. for a predetermined period of time. The maintaining time of the heating state is, e.g., 0.5–1.5 seconds. The cooling roll 107 cools (10° C.–40°) and solidifies the joined olefin type films 15 and the oriented film 200 to form the partial laminate film 120a. Next, the partial laminate film 120a is bonded to the remaining partial laminate film 120b including the olefin type film 15 and the co-extrusion film 14 by means of the same device 115 as shown in FIG. 6. That is, the partial laminate film 120a and the olefin type film 15 are fed into a space between the two rolls 102, 103 by means of the feeding means (not shown) in a state wherein the olefin type film 15 is opposed to the heating roll 102 while the oriented film 200 is opposed to the rubber roll. At the same time, the co-extrusion film 14 is fed between the partial laminate film 120a and the olefin type film 15 to form the laminate film 120 in a state wherein the olefin type resin layer 13 is opposed to the olefine type film 15 while the heat adhesion resin layer 16 is opposed to the partial laminate film 120a. At this time, the laminate film 120 is maintained at a temperature of 160° C.–200° C. for 0.5–1.5 seconds. The bonded laminate film 120 is then cooled by the cooling roll 104 to a temperature of 10° C.–40° C. The laminate film 120, manufactured in this manner is adapted to the infusion solution bag 20 in FIG. 3.

In this case, the olefin type films 15 located on the outerside of the bag 20 prevents modification of the oriented film 200 due to hydrolysis. Therefore, even if the bag 20 is dipped into hot water, the bag 20 conforms to the standard of an extraction test for obtaining ultraviolet heat absorption spectrum. Further, the combination of flexibility of the olefin type film 15 located on the outerside of the bag 20 and rigidity of the oriented film 200 maintains a suitable stiffness of the bag 20 as a whole and a suitable flexibility. Therefore, in the case of the infusion solution bag 20, the outer shape can be changed in accordance with the amount of dropping of content therein thereby to maintain a constant dropping velocity.

In general, the oriented film of ethylene-vinyl alcohol copolymer resin has a good oxygen barrier property when it is dried. However, the oxygen barrier property thereof is decreased and a whitening phenomenon occurs when it is wet. In contrast, in the laminate film 120 according to this invention, a transparency was not decreased due to the whitening phenomenon so that a user could see foreign matters in the bag 20 through the laminate film 120 even after a retort pasteurization treatment was carried out.

The heat resistant bag was not broken during a retort pasteurization treatment at a temperature of 150° C. and for 60 minutes. A good property for strength against dropping of the bag including content therein was confirmed.

In the above embodiment, only one film 200 with the vapor deposition coats 11, 11 of aluminum oxide on its both surfaces is used, and, however, more than one oriented film 20 may be used. In this case, those oriented films 200 are joined to each other by modified polypropylene. If the content in the bag has a high acidity, it is preferable that silica is vapor-deposited on the oriented film 200 and a vapor deposition coat of aluminum oxide is then formed thereon to prevent the decrease of a barrier property.

Instead of the vapor deposition coat of aluminum oxide, a vapor deposition coat of silicon oxide may be formed.

In the above embodiments, the olefin type resin layer 12 of the co-extrusion resin layer 14 makes up for defects in workability of the heat adhesion resin layer 16. In addition, in the third embodiment, the vapor deposition coats 11, 11 of the oriented film 200 of the ethylene-vinyl alcohol copolymer resin prevents the oriented film 200 from absorbing much moisture thereby to maintain a good oxygen barrier property.

Figure 8:
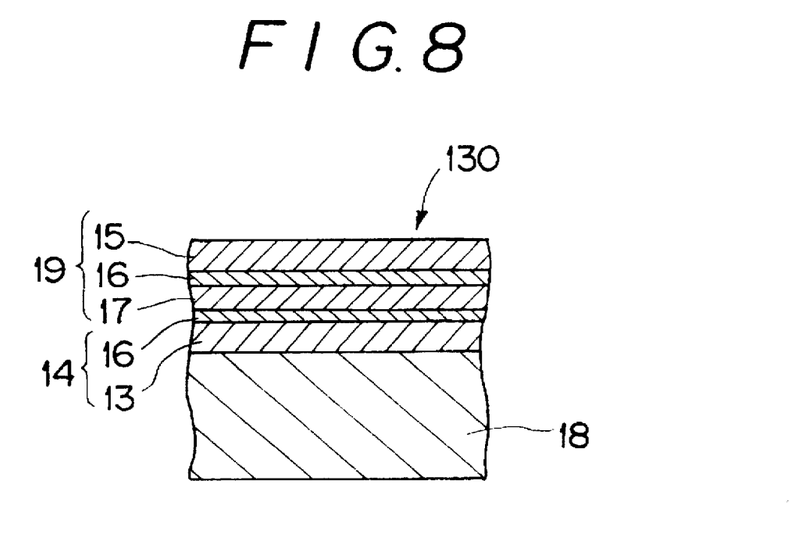
FIG. 8 is a schematic sectional view showing a fourth embodiment of a laminate film for retort package material.

FIG. 8 is a sectional view showing a fourth embodiment of a laminate film according to this invention.

A laminate film 130 is suitable for a package in which curry as retort food or cooking material is accommodated. The laminate film 130 comprises an olefin type film (polyester film) 15 of a thickness of 15 μm, having a heat resistant property and not having a heat hydrolysis property, a heat adhesion resin layer 16 of a thickness of 15 μm, disposed adjacent to the olefin type film 15, an aluminum foil 17 of a thickness of 9 μm, disposed adjacent to the heat adhesion resin layer 16, a co-extrusion resin layer 14 including a heat adhesion resin layer 16 and an olefin type resin layer 13, disposed adjacent to the aluminum foil 17, and an olefin type film (cast polypropylene film) 18 of a thickness of 50 μm, disposed adjacent to the co-extrusion resin layer 14. The olefin type film 18 is much thicker than the olefin type film 15. That is, the laminate film 130 comprises a partial laminate film 19 including the olefin type film 15, the aluminum foil 17 and the heat adhesion resin layer 16 for bonding the olefin type film 15 to the aluminum foil 17, the olefin type film 18, and the co-extrusion resin layer 14 for bonding the partial laminate film 19 to the olefin type film 18.

A fourth embodiment of the present method for manufacturing laminate film 130 will now be explained.

First, the partial laminate film 19 is manufactured by means of the device 100 shown in FIG. 2 which has the T-die 101 for extrusion of a single layer. That is, the olefin type film 15 and the aluminum foil 17 is bonded to each other via the heat adhesion resin layer 16 extruded from the T-die 101 by means of the cooling roll 102, the heating roll 104 and the cooling roll 107. At this time, the olefin type film 18 is also prepared. Then, as shown, in FIG. 9, the partial laminate film 19 and the olefin type film 18 are fed between the rubber roll 103 and the heating roll 112 disposed under the T-die 111 by separated feeding devices (not shown) in a state wherein the olefin type film 18 is opposed to the heating roll 112 at a temperature of 160° C.–200° C. while the partial laminate film 19 is opposed to the rubber roll 103. With respect to the partial laminate film 19, the olefin type film 15 is opposed to the rubber roll 103 while the aluminum foil 17 is opposed to the heat adhesion resin layer 16 of the co-extrusion resin layer 14. At the same time, the co-extrusion resin layer 14 at a temperature of 190° C.–300° C. is supplied between the partial laminate film 19 and the olefin type film 18 in a state wherein the heat adhesion resin layer 16 is opposed to the aluminum foil 17 of the partial laminate film 19 while the olefin type resin layer 13 is opposed to the olefin type film 18 to co-extrude the partial laminate film 19, the co-extrusion resin layer 14 and the olefin type film 18. The heating roll 112 maintains the joined three films 14, 18, 19 in a heating state of a temperature of 160° C.–200° C. for a predetermined period of time. The predetermined time is 0.5–1.5 seconds. The cooling roll 104 cools the laminate film 130 to a temperature of 10° C.–40° C. to solidify it.

Figure 10:
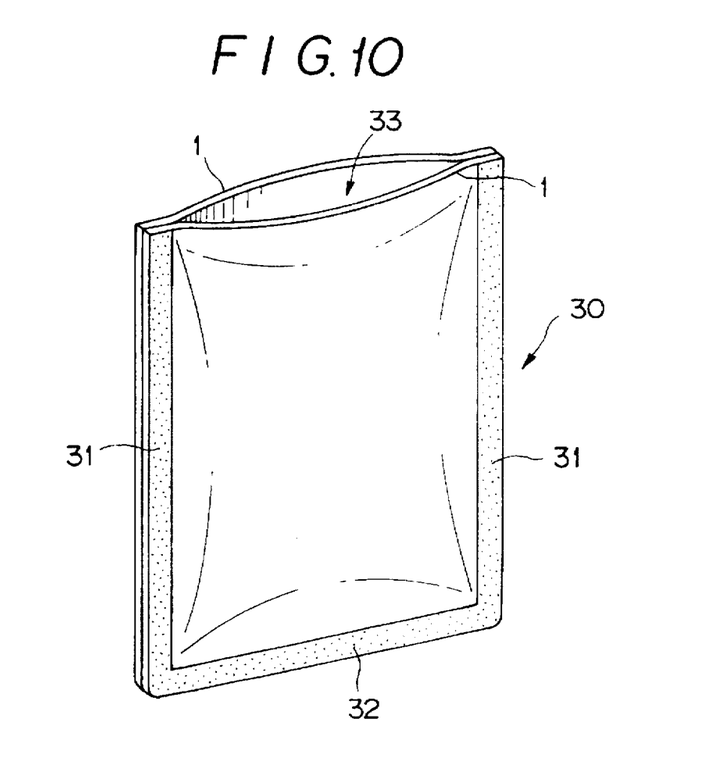
FIG. 10 is a perspective view of a bag for retort food, using a laminate film manufactured by a method of this invention.

When, a bag 30 (FIG. 10) for retort food is manufactured by using the laminate film 130, two laminate films 33 are overlapped, and the opposite side edges and the lower edge thereof are heat-sealed by a heat sealing means respectively. Content to be accommodated therein is put into the bag 30 from an opening 33 which is thereafter heat-sealed. The bag 30 was not broken during a retort pasteurization treatment, and shows a good strength property against dropping of the bag 30 on a floor.

Figure 9:
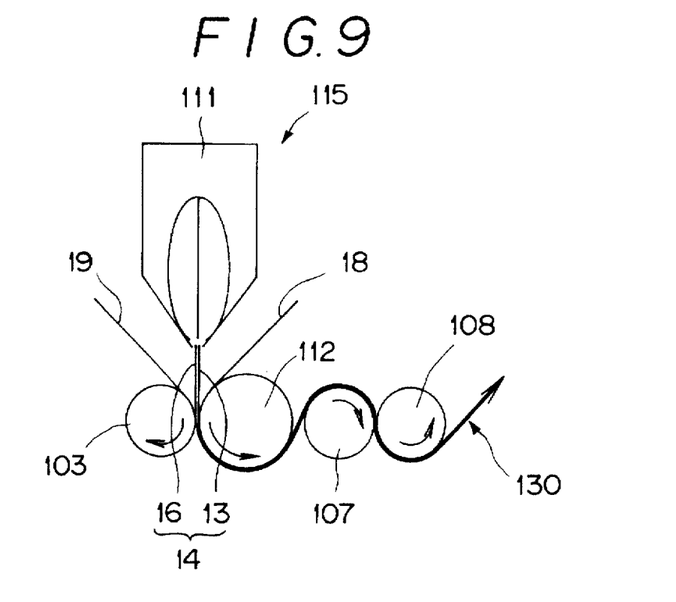
FIG. 9 is a schematic explanatory view showing a fourth embodiment of a method of manufacturing a laminate film according to this invention.

In this embodiment, the co-extrusion resin layer 14 is maintained in a heating state for a predetermined time and then cooled to solidify it to bond the partial laminate film to the olefin type film 18. Thereby, a laminating process can be performed continuously to shorten the process and to increase productivity. Further, the films to be laminated are not deviated from each other to prevent the generation of wrinkles of the laminate film 130, and adhesive strength of each film is increased since the olefin type resin layer 13 makes up for the defects in workability with respect to the heat adhesion resin layer 16.

What is claimed is:

1. A laminate film which comprises:
   a) at least one heat resistant polyester film with a vapor deposition coat including at least 98 wt % amorphous aluminum oxide on each surface thereof;
   b) olefin films disposed on both sides of the heat resistant polyester film, the olefin films having a heat resistant property, but not a hydrolysis property; and
   c) heat adhesion resin layers disposed between the olefin films and the heat resistant polyester film, respectively, for joining the olefin films to the heat resistant polyester film.

2. A laminate film according to claim 1, wherein each olefin film has a Young's modulus of less than 30 kg/mm$^2$ and a tensile strength of more than 100 kg/cm$^2$.

3. A laminate film according to claim 1, wherein each olefin film comprises a composition in which a rubber type elastomer obtained by emulsion polymerization is mixed into a copolymer of polypropylene and ethylene.

4. A laminate film according to claim 1, where each heat adhesion resin layer comprises a layer of polypropylene modified by maleic anhydride.

5. A laminate film according to claim 1, further comprising a vapor deposition coat of silica formed directly on the heat resistant film, wherein the vapor deposition coat of amorphous aluminum oxide is formed on the vapor deposition coat of silica.

6. A laminate film which comprises:
   a) at least one heat resistant polyester film with a vapor deposition coat of silicon oxide on each surface thereof;
   b) olefin films disposed on both sides of the heat resistant polyester film, the olefin films having a heat resistant property, but not a hydrolysis property; and
   c) heat adhesion resin layers disposed between the olefin films and the heat resistant polyester film, respectively, for joining the olefin films to the heat resistant polyester film.

7. A heat resistant container made of a laminate film which comprises:
   a) at least one heat resistant polyester film with a vapor deposition coat including at least 98 wt % amorphous aluminum oxide on each surface thereof;
   b) olefin films disposed on both sides of the heat resistant polyester film, the olefin films having a heat resistant property, but not a hydrolysis property; and c) heat adhesion resin layers disposed between the olefin films and the heat resistant polyester film, respectively, for joining the olefin films to the heat resistant polyester film.

8. A laminate film which comprises:

a) at least one heat resistant polyester film with a vapor deposition coat including at least 98 wt % amorphous aluminum oxide on each surface thereof;

b) olefin films disposed on both sides of the heat resistant polyester film, the olefin films having a heat resistant property, but not a hydrolysis property; and c) co-extrusion resin layers including a heat adhesion resin layer and an olefin layer, and disposed between the olefin films and the heat resistant polyester film, respectively, for joining the olefin films to the heat resistant polyester film.

9. A laminate film according to claim 8, wherein the olefin film comprises a composition in which a rubber type elastomer obtained by emulsion polymerization is mixed into copolymer of polypropylene and ethylene.

10. A laminate film according to claim 8, wherein the heat resistant film comprises a polyester film.

11. A heat resistant container made of a laminate film which comprises:

a) at least one heat resistant polyester film with a vapor deposition coat including at least 98 wt % amorphous aluminum oxide on each surface thereof;

b) olefin films disposed on both sides of the heat resistant polyester film, the olefin films having a heat resistant property, but not a hydrolysis property; and c) co-extrusion resin layers including a heat adhesion resin layer and an olefin layer and disposed between the olefin films and the heat resistant polyester film, respectively, for joining the olefin films to the heat resistant polyester film.

12. A laminate film which comprises:

a) at least one oriented film of one of ethylene-vinyl alcohol copolymer resin and polyester resin with a vapor deposition coat including at least 98 wt % amorphous aluminum oxide on each surface thereof;

b) olefin films disposed on both sides of the oriented film, the olefin films having a heat resistant property, but not a hydrolysis property; and c) co-extrusion resin layers including a heat adhesion resin layer and an olefin layer and disposed between the olefin films and the oriented film, respectively, for joining the olefin films to the oriented film.

13. A laminate film according to claim 12, wherein the olefin film comprises a composition in which a rubber type elastomer obtained by emulsion polymerization is mixed into a copolymer of polypropylene and ethylene.

14. A method of manufacturing a laminate film which comprises the steps of:

a) preparing olefin films having a heat resistant property, but not a hydrolysis property, and at least one heat resistant polyester film with a vapor deposition coat including at least 98 wt % amorphous aluminum oxide on each surface thereof;

b) melt-extruding a heat adhesion resin layer between the olefin films and the heat resistant polyester film;

c) maintaining the heat extrusion resin layer in a heating state for 0.5–1.0 seconds at a temperature of 160°–200° C.; and d) cooling and solidifying the heat adhesion resin layer to a temperature of 10°–40° C. so as to join the heat resistant polyester film to the olefin films.

15. A method of manufacturing a laminate film according to claim 14, wherein the step of maintaining the heat adhesion resin layer in a heating state comprises the step of cooling the heat adhesion resin layer under the melting point of the olefin film and the step of heating the heat adhesion resin layer to join the olefin films to the heat resistant film.

16. A method of manufacturing a laminate film according to claim 14, wherein one olefin film is joined to one surface of the heat resistant film and the other olefin film is thereafter joined to the other surface of the heat resistant film.

17. A method of manufacturing a laminate film which comprises the steps of:

a) preparing olefin films having a heat resistant property, but not a hydrolysis property, and at least one heat resistant polyester film with a vapor deposition coat including at least 98 wt % amorphous aluminum oxide on each surface thereof;

b) melt-extruding a co-extrusion resin layer including a heat adhesion resin layer and an olefin resin layer between the olefin films and heat resistant polyester film in a state wherein the heat adhesion resin layer is opposed to the heat resistant polyester film while the olefin resin layer is opposed to the olefin film;

c) maintaining the co-extrusion resin layer in a heating state for 0.5–1.0 seconds at a temperature of 160°–200° C.; and d) cooling and solidifying the co-extrusion resin layer to a temperature of 10°–40° C. so as to join the heat resistant polyester film to the olefin films.

18. A method of manufacturing a laminate film according to claim 17, wherein the step of maintaining the co-extrusion resin layer in heating state comprises the step of cooling the co-extrusion resin layer under the melting point of the olefin film and the step of heating the co-extrusion resin layer to join the olefin films to the heat resistant film.

19. A method of manufacturing a laminate film according to claim 17, wherein one olefin film is joined to one surface of the heat resistant film and the other olefin film is thereafter joined to the other surface of the heat resistant film.

20. A method of manufacturing a laminate film which comprises the steps of:

a) preparing olefin films having a heat resistant property, but not a hydrolysis property, and at least one oriented film of one of ethylene-vinyl alcohol copolymer resin and a polyester resin, each with a vapor deposition coat including at least 98 wt % amorphous aluminum oxide on each surface thereof;

b) melt-extruding a co-extrusion resin layer including a heat adhesion resin layer and an olefin resin layer between the olefin films and the oriented film in a state wherein the heat adhesion resin layer is opposed to the oriented film while the olefin resin layer is opposed to the olefin film;

c) maintaining the co-extrusion resin layer in a heating state for 0.5–1.0 seconds at a temperature of 160°–200° C.; and d) cooling and solidifying the co-extrusion resin layer to a temperature of 10°–40° C. so as to join the oriented film to the olefin films.

21. A method of manufacturing a laminate film which comprises the steps of:

a) preparing an olefin film and a partial laminate film comprising an aluminum foil, a heat resistant polyester film and a resin layer for joining the aluminum foil and the heat resistant polyester film to each other;

b) melt-extruding a co-extrusion resin layer including a heat adhesion resin layer and an olefin resin layer between the partial laminate film and the olefin film in a state wherein the heat adhesion layer is opposed to the aluminum foil while the olefin resin layer is opposed to the olefin film;

c) maintaining the co-extrusion resin layer in a heating state for 0.5–1.0 seconds at a temperature of 160°–200° C.; and d) cooling and solidifying the co-extrusion resin layer to a temperature of 10°–40° C. so as to join the partial laminate film to the olefin film.

* * * * *